United States Patent [19]

Heumiller

[11] Patent Number: 5,077,459
[45] Date of Patent: Dec. 31, 1991

[54] COMPOSITE METAL PANEL

[75] Inventor: Donald L. Heumiller, Newcastle, Australia

[73] Assignee: A. Goninan & Co. Limited, New South Wales, Australia

[21] Appl. No.: 473,951

[22] PCT Filed: Aug. 5, 1988

[86] PCT No.: PCT/AU88/00289
§ 371 Date: Apr. 5, 1990
§ 102(e) Date: Apr. 5, 1990

[87] PCT Pub. No.: WO89/01383
PCT Pub. Date: Feb. 23, 1989

[30] Foreign Application Priority Data

Aug. 11, 1987 [AU] Australia ............... PI3663

[51] Int. Cl.$^5$ ............................................. B23K 11/00
[52] U.S. Cl. ............................ 219/117.1; 219/78.11
[58] Field of Search ............... 219/117.1, 92, 78.11, 219/78.12

[56] References Cited

U.S. PATENT DOCUMENTS 3,598,953  8/1971  Campbell ........................ 219/117
3,689,730  9/1972  Campbell ........................ 219/82

FOREIGN PATENT DOCUMENTS 141318  5/1951  Australia.
233169  3/1961  Australia.
126207  9/1971  Australia.

Primary Examiner—Marvin M. Lateef
Attorney, Agent, or Firm—Bell, Seltzer, Park & Gibson

[57] ABSTRACT

A method of fabricating a composite metal panel (10) is disclosed, with the panel being particularly adapted for use in constructing railroad passenger cars, and comprising a sheet metal outer component (11) resistance-welded to the lands (15) of an underlying corrugated metal component (12). The method includes laying the outer component (11) on a cooled copper bed, which forms one electrode, and placing the corrugated component (12) having a plurality of laterally spaced apart lands (15), on top of the other component. A welding apparatus electrode is applied to the rear surface of the corrugated component at spaced-apart locations (X), and current is passed between the two electrodes to thereby resistance-weld the lands of the corrugated component to the outer component at the spaced-apart locations. The copper bed is cooled by passing a cooling fluid therethrough.

6 Claims, 2 Drawing Sheets

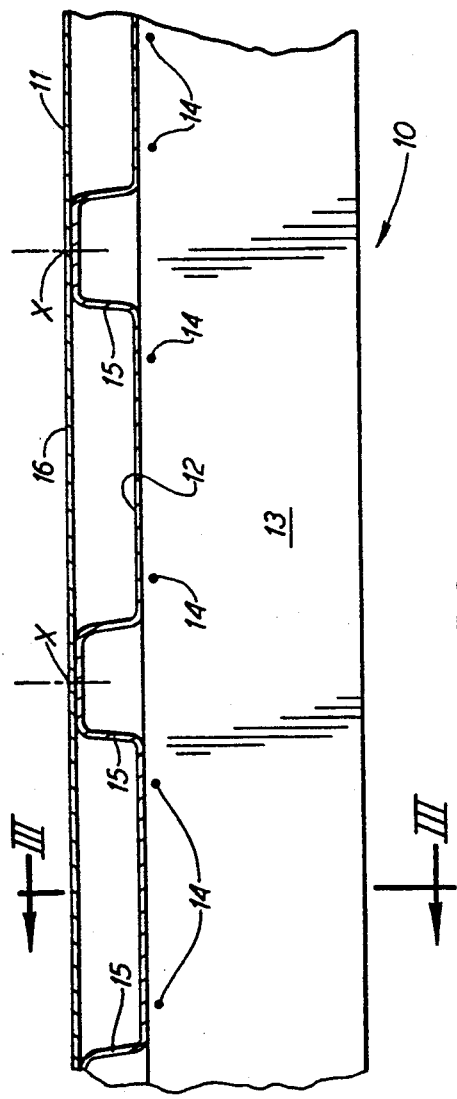
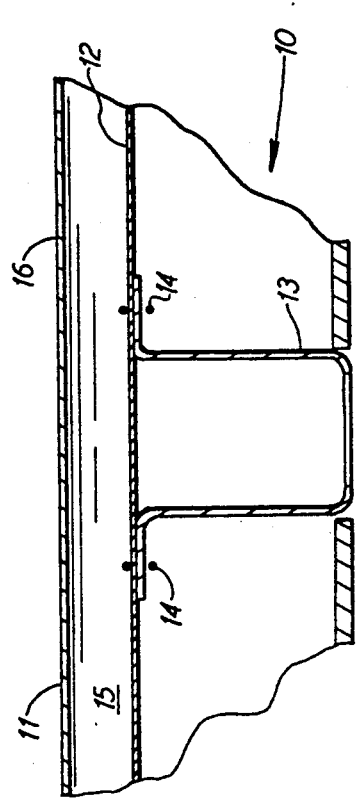

COMPOSITE METAL PANEL

TECHNICAL FIELD

This invention relates to composite metal panel construction useful for building or container panels, and more particularly to such panels for use in vehicular construction employing metal sheeting, such as railway rolling stock. The invention also relates to a method of fabricating such panels.

BACKGROUND ART

Modern railway passenger cars are usually fabricated from "angle" (L), "zed" (Z) or "top hat" (⊓) metal stock welded together to constitute a frame which is subsequently clad with sheet metal, such as stainless steel sheeting, spot welded or otherwise affixed to the frame.

It is difficult, however, to maintain the sheet flat during the cladding process, so that the external appearance of a railcar so clad may present an uneven appearance, or what is termed an "oil can" effect; that is to say, a rippled or dimpled appearance. Moreover, spot weld markings and heat discolorations also tend to mar the external appearance.

While such surface imperfections have purely a visual impact and are of no structural significance, reflections from the metal surface tend to exaggerate the unevenness of such cladding sheets and are quite noticeable when the cars are in service. This may well be unacceptable to the purchaser who may equate such with fragility or insubstantial construction.

Several methods have been proposed to mitigate surface imperfections, including welding stiffening members to the rear face of the sheet, finely grooving the surface, and even employing deeply corrugated or fluted panels. In conventional present day cars, such corrugated panels are widely used to conceal spot weld marks and heat discolourations associated therewith. However, when the use of large flat panels are mandatory, it has been proposed to fabricate a composite panel comprised of a "honeycomb" aluminium core "sandwiched" between stainless steel sheet stock, ideally adhesively bonded thereto. Such a panel is described and claimed in the specification relating to Australian Patent Application No. 66401/88. While this is considered to be an acceptable solution to the abovementioned problems, further investigations have led to the improved composite metal panels of the invention.

DISCLOSURE OF INVENTION

It is therefore an object of the present invention to overcome the above and other disadvantages by the provision of a composite metal panel, comprising a sheet metal outer component resistance-welded, at spaced-apart locations, to the lands, or ridges, of an underlying corrugated metal component.

In a second aspect thereof, the present invention further provides a method of fabricating a composite metal panel, comprising laying a sheet metal outer component upon a copper bed which constitutes one electrode of a resistance-welding system; placing an underlying corrugated metal component upon the outer component; applying an electrode of a welding apparatus to the rear surface of the corrugated component at spaced-apart locations; and passing a welding current between the two electrodes to thereby resistance-weld the lands, or ridges, of the corrugated component to the outer component at the spaced-apart locations, to constitute a said composite metal panel. The copper bed is cooled by a through-flow of coolant fluid, preferably refrigerated water ideally containing an anti-freeze ingredient.

In yet a further aspect, the invention consists in a vehicle, such as a railroad passenger car, whenever it is constructed using the composite metal panels of the abovementioned first aspect of the invention.

BRIEF DESCRIPTION OF DRAWINGS

In order that the reader may gain a better understanding of the present invention, hereinafter will be described one or more preferred embodiments thereof, by way of example only and with reference to the accompanying drawings in which:

FIG. 2 is a side elevation thereof; and

FIG. 3 is a section taken on line III—III of FIG. 2.

BEST MODE FOR CARRYING OUT THE INVENTION

Figure 1:
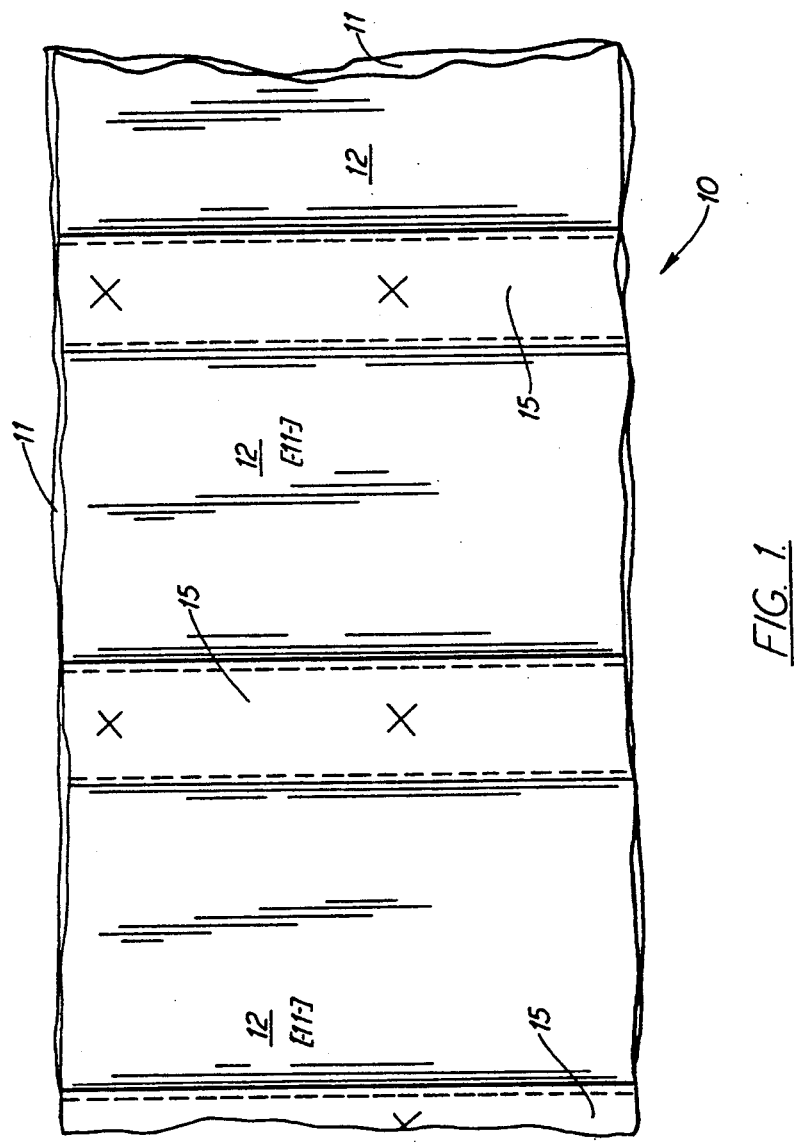
FIG. 1 is a bottom plan view of an inventive composite metal panel.

In the drawings, a composite metal panel in accordance with the present invention is generally referenced as 10. Panel 10 is comprised of an outer component 11, ideally of stainless steel sheet stock of about 1.8 millimeter thickness, welded to the lands, or ridges, 15 of an underlying corrugated metal component 12 which may be formed from, say, 0.8 millimeter thick sheet metal stock.

The composite metal panels of the present invention are fabricated by a method of resistance welding using special techniques.

Conventional spot/arc welding necessitates an electrode disposed on each side of the two juxtaposed components to be welded and it is this arrangement that produces the characteristics disfiguring spot weld discolouration, buckling and other distortion of the surface.

By contrast, the welding employed in the present invention may be considered to be single-sided spot welding, wherein the outer, stainless steel, cladding sheet is laid upon a copper bed which constitutes one of the contacts or electrodes for the welding process. The copper bed is cooled, ideally with a through-flow of refrigerated water—perhaps including anti-freeze ingredients—and the other electrodes is the tip of the welding apparatus, which is applied to the rear surface of the panel; these welds are indicated by 'X' in FIGS. 1 and 2, suitably spaced-apart.

By controlling the so-called "tip force" of the welding apparatus electrode, the time cycle involved, the current employed, and the degree of cooling, sufficient control can be attained to rapidly remove excess heat from the weld area and hence avoid spot weld discolouration.

The corrugated component 12 is spot welded in conventional manner to a frame member 13 of the railway vehicle at, say, the points indicated by the numeral 14; in this instance a "top hat" section member.

If there has been any residual "carry-through" of the weld to the external surface 16, such small blemishes may be removed by acid treatment; moreover, the external surface 16 may have applied to it a rough-textured finish or coating to conceal discolouration if present.

Ideally, the stainless steel sheets employed may initially be passed through a machine incorporating one or more rollers which imparts a textured finish known as a "shot blast effect". This textured external surface 16 may be acid treated, as referred to above, to completely remove any possible weld marks without affecting the shot-effect surface.

INDUSTRIAL APPLICABILITY

While the above description, with reference to FIGS. 1 to 3, is in terms of a planar, composite metal panel 10, the same welding method may be employed for curved and o.?1-shaped panels. Adjacent panels may be butted together and, at window and door reveals, moulded frames may be fitted around edges of the panel.

From the abovegoing, it will be readily appreciated by those skilled in the art that numerous variations and modifications may be made to the invention without departing from the spirit and scope thereof as set out in the following claims.

I claim:

1. A method of fabricating a composite metal panel (10) using a resistance-welding system having a welding apparatus electrode and a copper bed which constitutes a second electrode of said resistance-welding system; said method comprising the steps of:

laying a metal cladding sheet, which is adapted to constitute an outer component (11) of said composite metal panel (10), upon said copper bed;

providing a corrugated sheet having a plurality of laterally spaced apart lands (15) which extend continuously along the length of said corrugated sheet, and which is adapted to constitute an underlying, inner component (12) of said composite metal panel (10);

placing the corrugated sheet upon said outer component such that said lands thereof directly engage said outer component;

applying said welding apparatus electrode to the side of said inner component (12) facing opposite said outer component, and at a plurality of spaced-apart locations (X) which are directly aligned with respective ones of said lands; and passing a welding current between the said two electrodes so as to resistance-weld the lands (15) of said inner component (12) to said outer component (11), at the said spaced-apart locations (X), to so constitute said composite metal panel (10), and while cooling said copper bed by passing a coolant fluid therethrough;

whereby, by controlling the tip force of said welding apparatus electrode, the time cycle of application, the current employed and the degree of cooling, excess heat is able to be rapidly removed from the weld area to thereby avoid dimpling and spot-weld discoloration of the completed composite metal panel.

2. The method as claimed in claim 1, wherein said coolant fluid is refrigerated water containing an antifreeze ingredient.

3. The method as claimed in claim 1, including the further step of acid treating the external surface (16) of said outer component (11) to remove any weld marks therefrom.

4. The method as claimed in claim 1, wherein said outer component (11) is of stainless steel stock of about 1.8 millimeter thickness.

5. The method as claimed in claim 4, wherein said inner component (12) is formed from sheet metal stock of about 0.8 millimeter thickness.

6. The method as claimed in claim 1 wherein said lands are substantially flat surfaces.

* * * * *